US008756671B2

(12) United States Patent  
Kakuta et al.

(10) Patent No.: US 8,756,671 B2
(45) Date of Patent: Jun. 17, 2014

(54) INFORMATION PROCESSING APPARATUS, SECURITY METHOD, AND STORAGE MEDIUM STORING SECURITY PROGRAM

(75) Inventors: Jun Kakuta, Kawasaki (JP); Ryuichi Matsukura, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 503 days.

(21) Appl. No.: 12/814,806

(22) Filed: Jun. 14, 2010

(65) Prior Publication Data

US 2010/0325712 A1 Dec. 23, 2010

(30) Foreign Application Priority Data

Jun. 19, 2009 (JP) .................................. 2009-146158

(51) Int. Cl.
*G06F 7/04* (2006.01)
(52) U.S. Cl.
USPC .......................................................... 726/7
(58) Field of Classification Search
USPC .......................................................... 726/7
See application file for complete search history.

(56) References Cited

U.S. PATENT DOCUMENTS

| | | | | |
|---|---|---|---|---|
| 4,829,296 A | * | 5/1989 | Clark et al. | 340/5.65 |
| 2003/0109254 A1 | * | 6/2003 | Motegi et al. | 455/435 |
| 2003/0134654 A1 | * | 7/2003 | Masuda et al. | 455/522 |
| 2004/0203342 A1 | * | 10/2004 | Sibecas et al. | 455/11.1 |
| 2006/0003788 A1 | | 1/2006 | Yokoshi et al. | |
| 2009/0005964 A1 | * | 1/2009 | Forstall et al. | 701/201 |
| 2009/0164309 A1 | * | 6/2009 | Mgrdechian et al. | 705/10 |
| 2010/0302584 A1 | * | 12/2010 | Watanabe | 358/1.15 |

FOREIGN PATENT DOCUMENTS

| | | |
|---|---|---|
| JP | 2001-028782 | 1/2001 |
| JP | 2005-348290 | 12/2005 |
| JP | 2006-020003 | 1/2006 |
| JP | 2007-019719 | 1/2007 |
| JP | 2008-172669 | 7/2008 |

\* cited by examiner

*Primary Examiner* — Teshome Hailu
*Assistant Examiner* — Abiy Getachew
(74) *Attorney, Agent, or Firm* — Staas & Halsey LLP

(57) ABSTRACT

An information processing apparatus includes a key information table memory for storing, in a key information table, key information including first identification information identifying a first nearby device communicating with the information processing apparatus, a communication unit for communicating with a second nearby device present at a location where the second nearby device is communicable with the information processing apparatus, a nearby device information retrieval unit for retrieving nearby device information including second identification information identifying the second nearby device, a movement halt detector for detecting a movement status of the information processing apparatus, a functional limitation determiner for determining, based on the key information, the nearby device information, and/or the movement status, whether to limit execution of a process of a function of the information processing apparatus and a functional limitation executer for controlling the execution of the process based on the determination results.

20 Claims, 12 Drawing Sheets

FIG.5

| LOCATION | TYPE | DEVICE ID | STRENGTH OF RADIO WAVE (dB) | MARGIN |
|---|---|---|---|---|
| A | NORMAL | xx:xx:xx:xx:xx:xx | −80 | 20 |
|  |  | yy:yy:yy:yy:yy:yy | −75 | 14 |
|  |  | zz:zz:zz:zz:zz:zz | −90 | 24 |
| C | AUTOMATIC | aa:aa:aa:aa:aa:aa | −65 | 10 |
|  |  | bb:bb:bb:bb:bb:bb | −50 | 6 |
| D | AUTOMATIC | cc:cc:cc:cc:cc:cc | −78 | 10 |
|  |  | dd:dd:dd:dd:dd:dd | −80 | 12 |
|  |  | ee:ee:ee:ee:ee:ee | −60 | 18 |
| E | NORMAL | ff:ff:ff:ff:ff:ff | −50 | 2 |
|  |  | gg:gg:gg:gg:gg:gg | −75 | 20 |
|  |  | hh:hh:hh:hh:hh:hh | −80 | 10 |
| … | … | … | … | … |

| STARTING POINT LOCATION | DETERMINATION PERIOD | SPECIFIC DISTANCE (RADIUS) | CONDITION WITHIN MARGIN |
|---|---|---|---|
| NORMAL | 5min | 20m | ONE KEY DEVICE DETECTED |
| AUTOMATIC | 3min | 10m | TWO KEY DEVICES DETECTED |

| IMMEDIATELY PRECEDING LOCATION | EXCEPTION CONDITION |
|---|---|
| NORMAL | MOVING WITH TWO KEY INFORMATION DEVICES IMMEDIATELY AHEAD |
| AUTOMATIC | MOVEING WITH xx:xx:xx:xx:xx:xx |

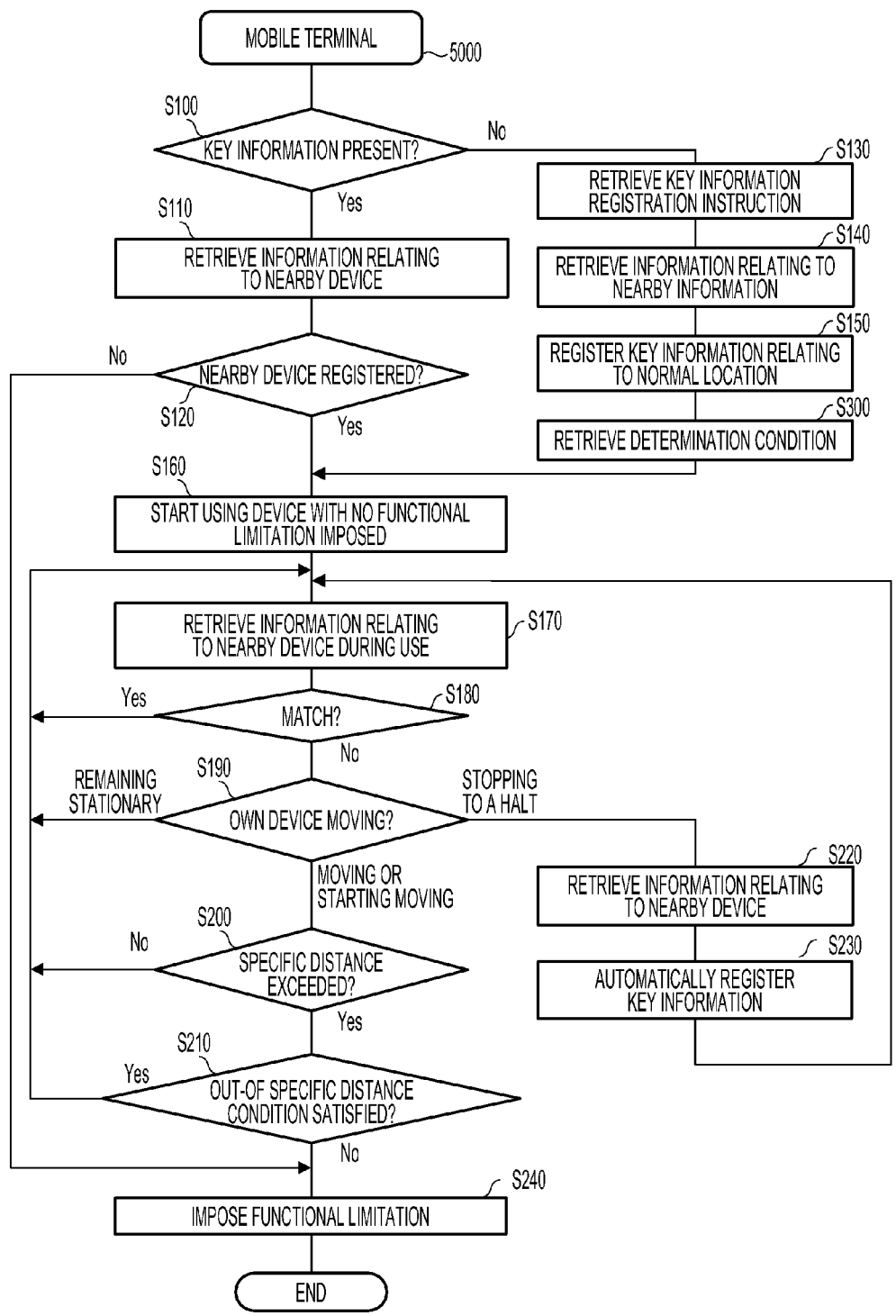

INFORMATION PROCESSING APPARATUS, SECURITY METHOD, AND STORAGE MEDIUM STORING SECURITY PROGRAM

CROSS-REFERENCE TO RELATED APPLICATIONS

This application is based upon and claims the benefit of priority of the prior Japanese Patent Application No. 2009-146158, filed on Jun. 19, 2009, the entire contents of which are incorporated herein by reference.

FIELD

The embodiments discussed herein are related to a security function of an information processing apparatus.

BACKGROUND

Mobile information processing apparatuses, such as a notebook computer, are becoming more and more sophisticated in function. Such mobile information processing apparatuses are used not only for personal purposes but also in a variety of business activities in corporations. The mobile information processing apparatus is hereinafter referred to as a "mobile terminal."

If a mobile terminal is used in a business activity in a corporation, the mobile terminal may store corporate internal information or corporate secret information. Information related to customers and private information of the user of the mobile terminal may also be stored on the mobile terminal.

If such a mobile terminal is missing, or is stolen by an unscrupulous third party, there is a risk of information leakage.

A technique is available to prevent information leakage. In accordance with the technique, the mobile terminal is allowed to be used only if a condition is satisfied. The condition may be satisfied by an authorized user only in order to prevent an unscrupulous third party from using the mobile terminal. The third party is thus excluded from the possibility of using the mobile terminal, and the information stored on the mobile terminal is prevented from leaking out.

Japanese Laid-open Patent Publication No. 2006-20003 discusses a technique that limits a function of a communication terminal if a distance between a radio key device and the communication terminal exceeds a specific distance.

In accordance with the technique discussed in Japanese Laid-open Patent Publication No. 2006-20003, the communication terminal is spaced apart from an authorized user having the radio key device by a specific distance or longer, the functional limitation is imposed on the communication terminal. If the communication terminal is missing or stolen and spaced apart from the radio key device by a specific distance or longer, an unscrupulous third party having stolen the communication terminal has difficulty using the communication terminal in a normal operation.

If the radio key device and the communication terminal are missing together or stolen together, an unscrupulous third party may use the communication terminal in a manner free from any limitation. An authorized user may forget a radio key device at the user's own home and may not hold the key device at hand. In such a case, even the authorized user may not use the communication terminal.

Japanese Laid-open Patent Publication No. 2005-348290 discusses a technique that uses no radio key device. In accordance with the technique, security means of an information processing apparatus is implemented in response to an information device present surrounding the information processing apparatus.

The information processing apparatus discussed in Japanese Laid-open Patent Publication No. 2005-348290 registers beforehand a device ID supposed to be present close to the information processing apparatus. The information processing apparatus, when used, searches a nearby authentication key device and retrieves the device ID thereof. The information processing apparatus checks the retrieved device ID against the registered device ID and calculates a security level. The information processing apparatus implements the security means responsive to the calculated security level.

The information processing apparatus discussed in Japanese Laid-open Patent Publication No. 2005-348290 implements the security means thereof at a location where an information device having the registered device ID is not detected. Information leakage is thus prevented even if an unscrupulous third party has stolen the information processing apparatus. It is less likely that the information processing apparatus and the nearby authentication key device are together missing or together stolen. The technique discussed in Japanese Laid-open Patent Publication No. 2005-348290 thus overcomes the problem expected when the radio key device is used.

SUMMARY

According to an aspect of the invention, an information processing apparatus includes, a key information table memory for storing, in a key information table, key information including first identification information identifying a first nearby device communicating with the information processing apparatus, a communication unit for communicating with a second nearby device present at a location where the second nearby device is communicable with the information processing apparatus, a nearby device information retrieval unit for retrieving nearby device information including second identification information identifying the second nearby device that has communicated with the information processing apparatus, a movement halt detector for detecting a movement status of the information processing apparatus, a functional limitation determiner for determining, based on a combination of the key information, one or more other nearby device information, and the movement status, whether to limit execution of a process of a function of the information processing apparatus and a functional limitation executer for controlling the execution of the process based on the determination results.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a structure and content of a key information table in accordance with the first embodiment.

FIG. 12 is a flowchart illustrating a functional limitation process of the mobile terminal in accordance with the second embodiment.

DESCRIPTION OF EMBODIMENTS

If a pre-registered nearby information device is mobile in the case of the technique discussed in Japanese Laid-open Patent Publication No. 2005-348290, a calculated security level may be different when a user attempts to use an information processing apparatus. Security means to be implemented varies, and a function that could be used before the calculation of the security level may be used no longer.

This is because a mobile information device indicated by a registered ID may not be at a nearby location when the information processing apparatus searches for a pre-registered nearby mobile information device. In such a case, an authorized user may not use the information processing apparatus even at a pre-registered location. This inconveniences the user.

The inventors have invented an information processing apparatus, a security method, and a security program storing medium for assuring security of the information processing apparatus using a nearby information device with user friendliness increased.

First Embodiment

Figure 1:
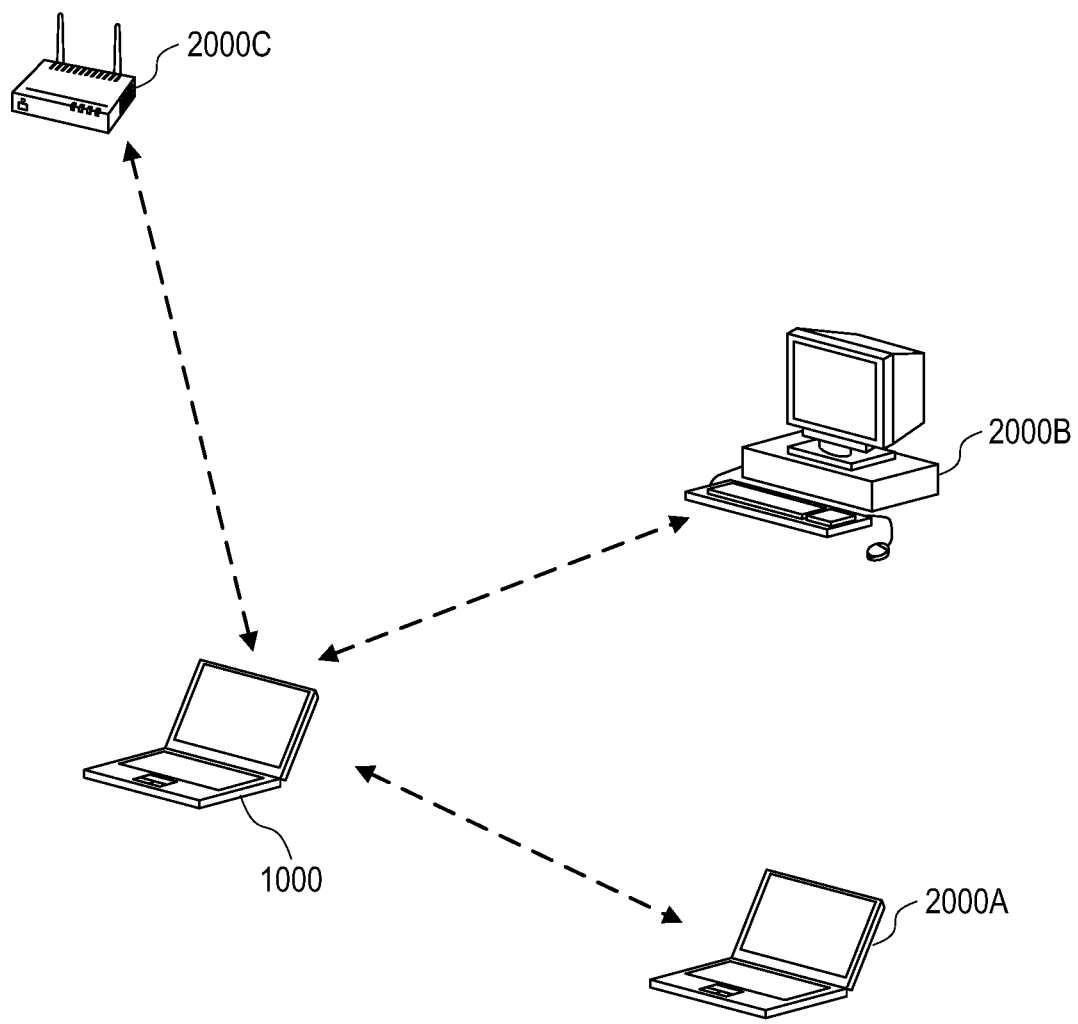
FIG. 1 illustrates a usage example of an information processing apparatus having a security function in accordance with a first embodiment.

FIG. 1 illustrates a usage example of an information processing apparatus with a security function (i.e., a target securable information processing apparatus) in accordance with a first embodiment. The target securable information processing apparatus can be any type of computing apparatus, for example, mobile, desktop, mainframe, etc.

A user may now use a mobile terminal 1000 as the information processing apparatus having the security function (a target securable mobile information processing apparatus) at the user's own seat in an office. The mobile terminal 1000 may be a notebook computer, for example.

The security function is activated to limit the function of the information processing apparatus if a certain condition is not satisfied. More specifically, the security function restricts the operation of a specific function. For example, the security function may prevent all the operations other than displaying a log-in screen from being executed. Moreover, the security function may disable a connection to a network.

For example, business colleagues may be using notebook computers 2000A and 2000B around the mobile terminal 1000. The mobile terminal 1000 is wirelessly communicable with each of the notebook computers 2000A and 2000B. A communication method in the embodiment is BLUETOOTH.

The mobile terminal 1000 is also connected to an access point 2000C of a wireless local-area network (LAN).

One or more information devices present around the mobile terminal 1000 are collectively referred to as a nearby device 2000. The nearby device 2000 thus represents each or all of the notebook computer 2000A, the notebook computer 2000B, and the access point 2000C. In the discussion that follows, for example, the notebook computer 2000B may be quoted if the notebook computer 2000B needs to be discriminated from the other devices.

Whether to limit the function of the mobile terminal 1000 is determined by accounting for the movement status of the mobile terminal 1000 in addition to the presence of the nearby device 2000. The movement status refers to whether the mobile terminal 1000 has moved or not and a travel distance of the mobile terminal 1000.

Figure 2:
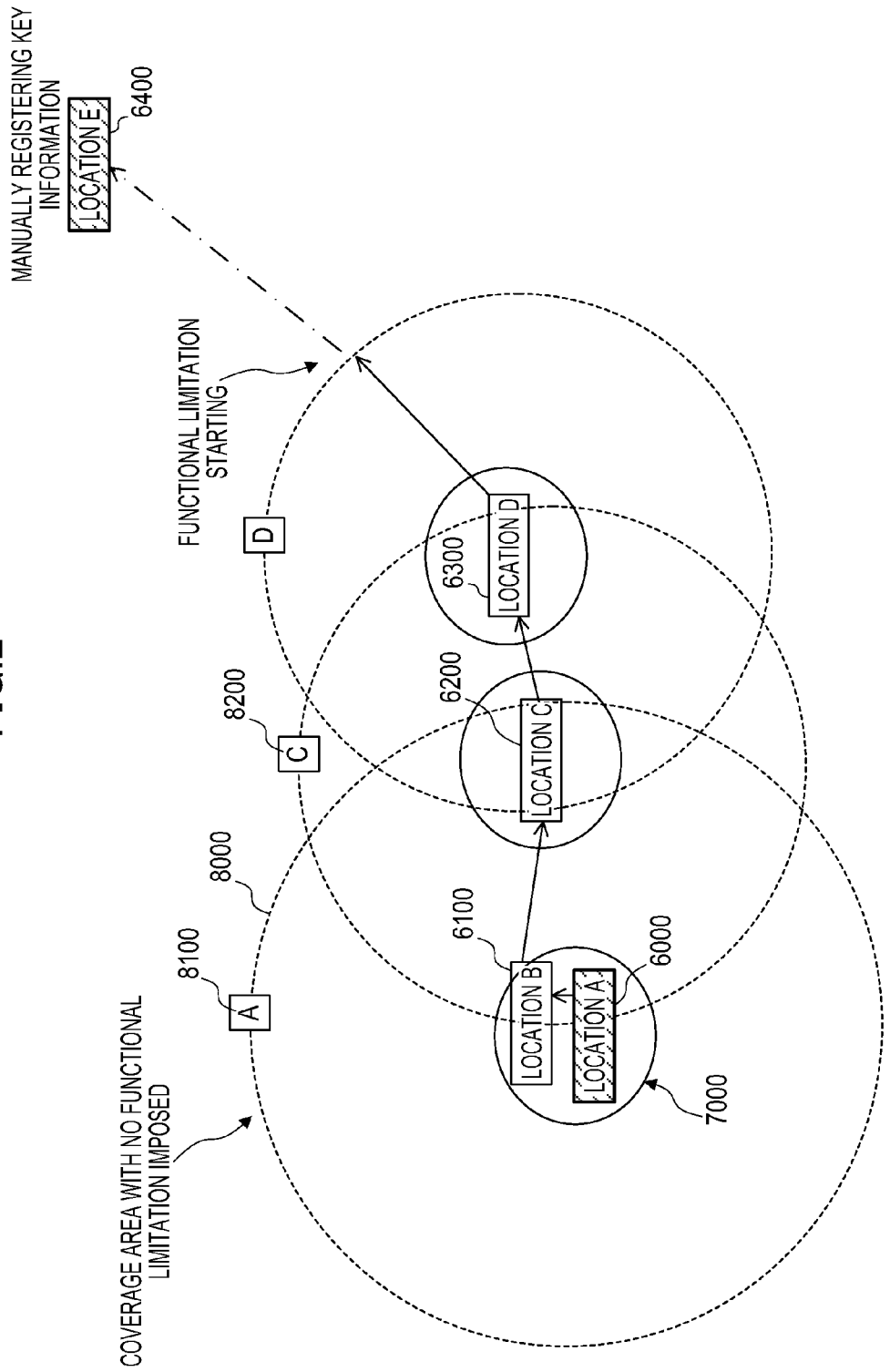
FIG. 2 is a first chart illustrating a relationship between a movement route of a mobile terminal and key information in accordance with the first embodiment.
Figure 3:
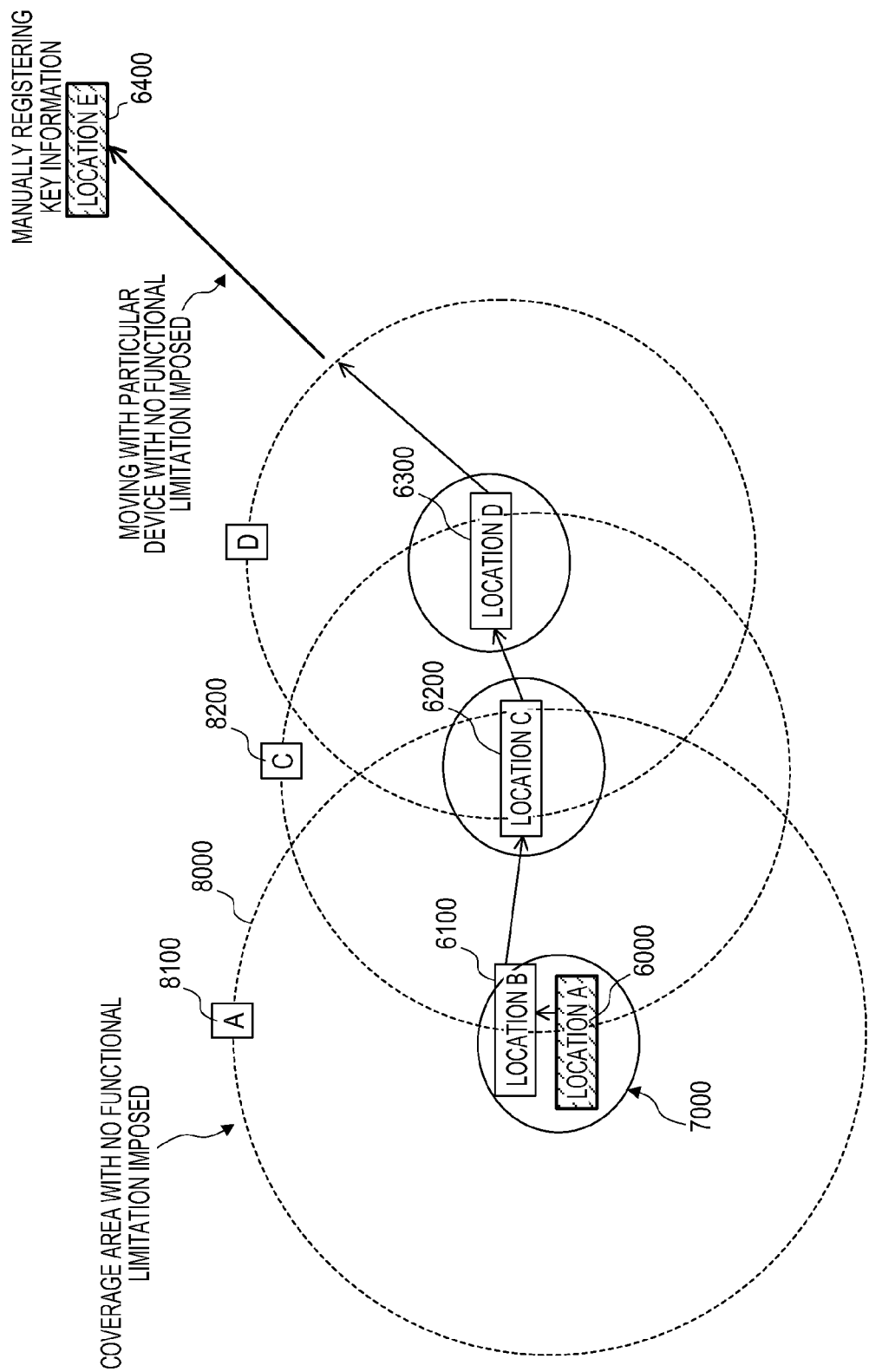
FIG. 3 is a second chart illustrating a relationship between a movement route of the mobile terminal and key information in accordance with the first embodiment.

Referring to FIGS. 2 and 3, the usage example of the mobile terminal 1000 by a user is described.

FIGS. 2 and 3 illustrate a relationship between a movement route and key information of the mobile terminal 1000.

In FIGS. 2 and 3, location A 6000 and other labels refer to locations where information of the nearby device 2000 present around the mobile terminal 1000 was registered. The information of the nearby device 2000 is hereinafter referred to as "key information." A hatched rectangular box refers to a location where a user manually registered the key information, and an unhatched rectangular box refers to a location where the key information was automatically registered.

A solid-lined circle surrounding the location A 6000 represents a "coverage area margin" 7000. The "coverage area margin" 7000 is an area that is considered to be the location A 6000. More specifically, the "coverage area margin" 7000 represents an area where the nearby device 2000 identified by the key information registered at the location A 6000 may be detected at a specific radio wave strength. The area of the specific radio wave strength is identical to an area considered to be the location A 6000. For example, the area of the specific radio wave strength can be a circular area having a radius of 5 meters centered on the position represented by the location A 6000. The margin will be described later with reference to the section of data.

A broken-lined circle surrounding the location A 6000 represents a "coverage area with no functional limitation imposed" 8000. The "coverage area with no functional limitation imposed" 8000 is an area within a specific travel distance from the location indicated by the location A 6000. For example, the "coverage area with no functional limitation imposed" 8000 represents an area within a distance of 20 meters from the location indicated by the location A 6000. No functional limitation is imposed on the mobile terminal 1000 within a specific distance from the location indicated by the location A 6000. A label "A" 8100 in a square on the broken-lined circle represents that the center of the circle is at the location A 6000. Similarly, the same is true of a label "C" 8200 in a square on another broken-lined circle. The travel distance will be described later with the section of data.

FIGS. 2 and 3 illustrate the "coverage area margins" and the "coverage areas with no functional limitation imposed". The "coverage area margin" and the "coverage area with no functional limitation imposed" become complex in shape in practice, depending on variations in the radio wave strength, a measurement method of the travel distance, errors, etc.

Referring to FIG. 2, a user of the mobile terminal 1000 registers information of the nearby device 2000 at the user's own seat at the location A 6000 in an office that is a normal working place. The information of the nearby device 2000 is the key information.

The mobile terminal 1000 then detects periodically the information of the nearby device 2000. As long as the detected information of the nearby device 2000 and the key information satisfy a specific condition, no functional limitation is imposed. For example, the user carrying the mobile terminal 1000 may move to a next seat at location B 6100 and may work there. Since the mobile terminal 1000 is still within the "coverage area margin" that is considered to be the location A 6000, no functional limitation is imposed.

Next, the user carrying the mobile terminal 1000 may move to work to a conference room at location C 6200 beyond the "coverage area margin" 7000 of the location A 6000. At the location C 6200, the mobile terminal 1000 may not detect the nearby device 2000 having the key information registered at the location A 6000. A location of the mobile terminal 1000 is not considered to be the location A 6000. The mobile terminal 1000 is present in the "coverage area with no functional limitation imposed" 8000 within a specific distance from the location A 6000. The mobile terminal 1000 does not impose functional limitation.

The mobile terminal 1000 itself may move as far as the mobile terminal 1000 becomes unable to detect the nearby device 2000 having matched key information. In such a case, no functional limitation is imposed as long as the mobile terminal 1000 is within a specific distance.

No functional limitation is imposed within a specific distance because there is no much necessity to limit the function of the mobile terminal 1000. For example, no functional limitation is imposed in the case of a short travel distance, for example, when the user moves from own seat to a conference room within a corporate building.

While the user participates in a conference within the conference room, the mobile terminal 1000 may automatically collect information of the nearby device 2000 at the location C 6200 and register the information as the key information. Since the user is working at a location where no functional limitation is imposed, the conference room may be registered as a working place without any problem. The automatic registration saves the user the trouble of registering the key information.

If the user has remained stationary for a specific period of time, the mobile terminal 1000 determines that the location is a working place and then registers the key information. The specific period of time may be 3 minutes, for example.

The user carrying the mobile terminal 1000 may then go work to a next conference room at a location D 6300 and may work there. In this case as well, the location D 6300 is within a specific distance from the location C 6200 and the mobile terminal 1000 does not limit the function. The mobile terminal 1000 automatically retrieves the information of the nearby device 2000 at the location D 6300 and then registers the key information. Referring to FIGS. 2 and 3, the specific distance defining the "coverage area with no functional limitation imposed" of the location A 6000 is longer than the "coverage area with no functional limitation imposed" of each of the location C 6200 and the location D 6300. This is because a condition of functional limitation is set to be severer in an automatic registration location than in a manual registration location.

The user carrying the mobile terminal 1000 then may go out of the corporate building.

If the mobile terminal 1000 is spaced apart from the location D 6300 by a specific distance or more, the mobile terminal 1000 is subject to functional limitation.

To register new key information at a branch office at location E 6400, the user manually registers the key information after a specific authentication process.

With the key information manually registered subsequent to the certain authentication process, the mobile terminal 1000 operates in a user friendly manner with security level maintained.

FIG. 3 illustrates a usage example in which no functional limitation is imposed with a condition satisfied even when the user is far from the key information registered location by a specific distance or longer.

For example, the user may move in a car together with another conference member using another nearby device 2000 with whom the user talked at the conference room at the location D 6300. In such a case, the detected information of the nearby device 2000 of the other conference member may remain the same as the key information registered at the location D 6300. In such a case, no functional limitation is imposed on the mobile terminal 1000 even if the mobile terminal 1000 is spaced apart from the location D 6300 by a specific distance or longer. The situation in this case is analogous to a moving conference room, and there is no much necessity to impose functional limitation.

When the user arrives at a conference room at a location E 6400 in the branch office and works there, the mobile terminal 1000 automatically collects information of the and/or other nearby device(S) 2000 at the location E 6400 and then registers the key information.

As described above, the mobile terminal 1000 increases user friendliness while maintaining security.

The mobile terminal 1000 as an information processing apparatus having a security function is described below with the drawings.

Function

Figure 4:
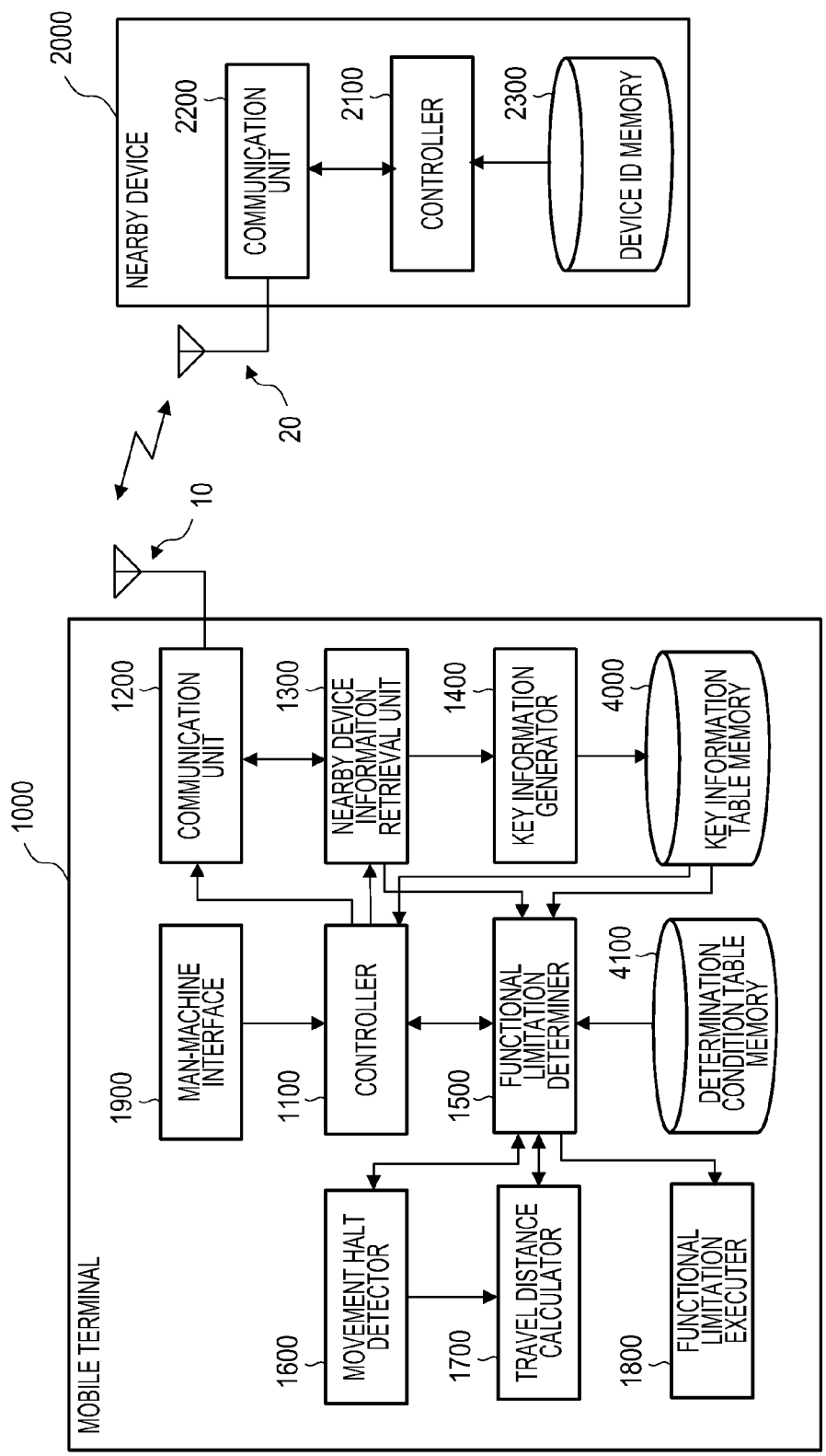
FIG. 4 is a block diagram illustrating elements of the mobile terminal and a nearby device in accordance with the first embodiment.

FIG. 4 is a block diagram of elements of the mobile terminal 1000 and the nearby device 2000.

The mobile terminal 1000 includes controller 1100, communication unit 1200, nearby device information retrieval unit 1300, key information generator 1400, functional limitation determiner 1500, movement halt detector 1600, travel distance calculator 1700, functional limitation executer 1800, man (user)-machine interface 1900, key information table memory 4000, and determination condition table memory 4100.

The controller 1100 performs a process that is intended to allow the mobile terminal 1000 to execute the basic function thereof. For example, the controller 1100 has a browser function if the mobile terminal 1000 is a notebook computer. The controller 1100 also has a function to control another functional block such that the mobile terminal 1000 works as the information processing apparatus having the security function.

The communication unit 1200 wirelessly communicates with the nearby device 2000 via an antenna 10. Communication methods supported by the communication unit 1200 include wireless LAN, Bluetooth, etc.

The nearby device information retrieval unit 1300 searches a nearby information device 2000, and collects information of the nearby device 2000. The nearby device information retrieval unit 1300 collects the information of the nearby device 2000 in order to register the key information or in order to use the mobile terminal 1000.

When the key information is collected for registration, the nearby device information retrieval unit 1300 retrieves, as the information of the nearby device 2000, a device ID, a radio wave strength, and margin of each nearby device 2000.

When the key information is collected in order to use the mobile terminal 1000, the nearby device information retrieval unit 1300 retrieves a device ID and radio wave strength of each nearby device 2000. These pieces of information collected in order to use the mobile terminal 1000 are referred to as nearby device information.

How the device ID, the radio wave strength, and the margin are determined is discussed below.

The nearby device information retrieval unit 1300 measures via the communication unit 1200 a communication state with a nearby information device now. If the communication method of the communication unit 1200 is Bluetooth, a near Bluetooth device is searched. The nearby device information retrieval unit 1300 performs a pairing process as a device authentication process, thereby retrieving a device ID. The nearby device information retrieval unit 1300 measures the radio wave strength by specifying the retrieved device ID. In the case of a wireless LAN access point, the nearby device information retrieval unit 1300 retrieves MAC address from the access point, and then measures the radio wave strength.

The radio wave strength varies depending on the environment. The nearby device information retrieval unit 1300 calculates a mean value of the radio wave strength at constant sampling intervals for a content period of time. The sampling intervals are every seconds for one minutes. The nearby device information retrieval unit 1300 sets the mean value as the radio wave strength of the device ID. The nearby device information retrieval unit 1300 calculates the standard deviation and sets twice the value of the standard deviation to be the value of margin. The value of margin may be determined based on the measurement value or may be a value of the system defined on each device, such as a Bluetooth device or a wireless access point.

The nearby device information retrieval unit 1300 measures the communication status of each of all the detected devices. The nearby device information retrieval unit 1300 determines the radio wave strength and margin on each device ID.

The key information generator 1400 generates the key information from the information of the nearby device 2000 retrieved by the nearby device information retrieval unit 1300. The key information generator 1400 registers the generated key information in a key information table stored on the key information table memory 4000.

The functional limitation determiner 1500 determines whether to limit the function of the mobile terminal 1000. The functional limitation determiner 1500 performs the determination process based on the nearby device information retrieved by the nearby device information retrieval unit 1300, the key information stored on the key information table memory 4000, information detected by the movement halt detector 1600, and a travel distance calculated by the travel distance calculator 1700.

Upon receiving an instruction from the controller 1100, the functional limitation determiner 1500 determines periodically with a specific period whether to limit the function.

The movement halt detector 1600 includes a three-axis speed sensor that outputs acceleration along three axes of X, Y, and Z with a constant period. The movement halt detector 1600 has the function of notifying the functional limitation determiner 1500 of the status of the mobile terminal 1000. More specifically, the movement halt detector 1600 detects one of the following three states: (1) moving state in which the mobile terminal 1000 has just started moving or is moving, (2) halt state in which the mobile terminal 1000 has come to a halt from a moving state, and (3) stationary state in which the mobile terminal 1000 has remained stationary since the key information was registered or since the key information was considered to be the same. The movement halt detector 1600 notifies the functional limitation determiner 1500 of a state change at which a detected state changes from an immediately previously detected state.

The movement halt detector 1600 monitors the acceleration the three-axis acceleration sensor outputs periodically from the startup of the mobile terminal 1000. The movement halt detector 1600 detects one of the three states and notifies the functional limitation determiner 1500 of the detected state.

The movement halt detector 1600 transfers to the travel distance calculator 1700 the acceleration periodically output by the three-axis sensor.

The acceleration periodically output with a specific period by the three-axis sensor includes X, Y, and Z acceleration values. While all of the output X, Y, and Z acceleration values are non-zero, the movement halt detector 1600 detects a moving state. If substantially zero X, Y, and Z acceleration values are detected for a constant period of time, the movement halt detector 1600 detects a halt state. If substantially zero X, Y, and Z acceleration values are detected, the movement halt detector 1600 detects a stationary state.

The travel distance calculator 1700 calculates a travel distance based on the acceleration periodically output from the movement halt detector 1600. The travel distance calculator 1700 calculates the travel distance each time the acceleration is transferred from the movement halt detector 1600 with the mobile terminal 1000 in operation. In response to a request from the functional limitation determiner 1500, the travel distance calculator 1700 transfers the calculated travel distance to the functional limitation determiner 1500.

The travel distance calculating method of the travel distance calculator 1700 is described below.

An acceleration is mathematically integrated twice with respect to time to calculate a distance traveled for a given time period. Using an acceleration sensor of two mutually perpendicular axes, two values of acceleration on a plane (vector values) are obtained. The vector values are integrated to determine a travel point reached from a previously measured point.

In accordance with the embodiment, two axes excluding an axis on which 1G (acceleration of gravity) constantly acts are considered to form a plane in a horizontal direction in a three-axis acceleration sensor. Like the two-axis acceleration sensor, the three-axis sensor determines a travel point reached from a previously measured point regardless of the posture in which the user holds the mobile terminal 1000. A variety of methods have been proposed to reduce an error of an acceleration sensor in the calculation of the travel distance. Any method may be used in the embodiment.

The functional limitation executer 1800 restricts a particular function among functions of the mobile terminal 1000.

The man-machine interface 1900 includes a keyboard, a display, etc. and detects an instruction from the user.

The key information table memory 4000 stores a key information table. The key information generator 1400 adds a record onto the key information table as appropriate.

The determination condition table memory 4100 stores a determination condition table for determining whether to limit the function.

The nearby device 2000 includes controller 2100, communication unit 2200, and device ID memory 2300.

The controller 2100 has a function basically supported by the nearby device 2000. For example, the controller 2100 has a browser function if the nearby device 2000 is a notebook computer, or a data transfer function if the nearby device 2000 is a wireless LAN access point.

The communication unit 2200 wirelessly communicates with another information processing apparatus such as the mobile terminal 1000 via an antenna 20. The communication unit 2200 supports a communication method such as wireless LAN or Bluetooth.

The device ID memory 2300 stores a device ID of the nearby device 2000 as own device. The device ID memory 2300 stores as a device ID a Bluetooth address if the nearby device 2000 is a Bluetooth device. The device ID memory 2300 stores as a device ID a MAC address if the nearby device 2000 is a wireless LAN access point.

Part or all of the functions described above are executed when CPUs of the mobile terminal 1000 and the nearby device 2000 perform respective programs stored on memories of the mobile terminal 1000 and the nearby device 2000.

Part or all of the functions related to security of the mobile terminal 1000 may be provided as middleware.

Data

Data used in the mobile terminal 1000 is described with reference to FIG. 5, FIGS. 6A-6C, and FIGS. 7A-7C.

FIG. 5 illustrates a structure and content of a key information table 4010.

The key information table 4010 is stored in the key information table memory 4000.

Key information is stored as a record on each location in the key information table 4010.

The mobile terminal 1000 collects periodically, the information of the nearby device 2000, as nearby device information. The mobile terminal 1000 does not limit the function thereof if the collected nearby device information is considered to be one piece of key information stored on the key information table 4010.

The key information table 4010 lists items including location 4011, type 4012, device ID 4013, radio wave strength 4014, and margin 4015.

The location 4011 is an identifier identifying a location where the key information stored on the key information table 4010 was retrieved. For convenience of explanation, the location 4011 lists "A," "C," . . . , but may be a mere number. The location may be represented in latitude and longitude. In such a case, the mobile terminal 1000 may include a global position system (GPS).

The type 4012 represents the type of the location indicated by the location 4011.

A type "normal" represents a location where the user manually registered the key information. The location where the user manually registered the key information is considered as a normally used location.

A type "automatic" represents a location where the mobile terminal 1000 automatically registered the key information.

The device ID 4013 indicates a device ID of the nearby device 2000 collected at the location indicated at the location 4011. More specifically, if the nearby device 2000 supports Bluetooth, a Bluetooth address is set as a device ID. In the case of a wireless LAN access point, a MAC address is set as a device ID. If a plurality of nearby devices 2000 is available, the device IDs 4013 of the respective nearby devices 2000 is registered.

The Bluetooth address and the MAC address are globally unique ID to each device.

The radio wave strength 4014 indicates a radio wave strength of the nearby device 2000 represented by the device ID 4013. The radio wave strength 4014 is a mean value of radio wave strengths measured for a constant period of time by the nearby device information retrieval unit 1300.

The margin 4015 is a tolerance range. If the radio wave strength as a determination target falls within a plus/minus range indicated by the margin 4015 with respect to a radio wave strength value indicated by the radio wave strength 4014, the mobile terminal 1000 treats the determination target radio wave strength as being equal to the radio wave strength indicated by the radio wave strength 4014. Optionally, if the determination target radio wave exceeds the radio wave strength value indicated by the radio wave strength 4014 by the plus range indicated by the margin 4015, the mobile terminal 1000 may treat the determination target radio wave strength as being equal to the radio wave strength indicated by the radio wave strength 4014.

The margin 4015 is set up because the radio wave strength value varies in response to even a slight distance movement of the nearby device 2000 as a mobile information processing apparatus. Furthermore, if the nearby device 2000 is a wireless LAN access point, the radio wave strength value varies greatly and frequently.

If the radio wave strengths fail to completely match each other, the mobile terminal 1000 may determine that the key information fails to match the collected information of the nearby device 2000. If the functional limitation is imposed accordingly, the user friendliness is degraded.

Figures 6A, 6B, 6C:
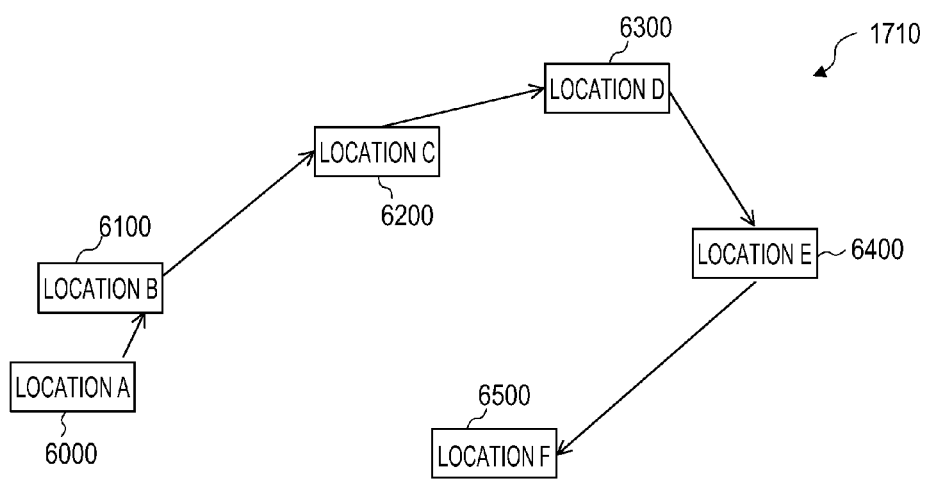
FIGS. 6A-6C illustrate a structure and content of each of first and second determination condition tables in accordance with the first embodiment.

FIGS. 6A-6B illustrate structures and contents of a first determination condition table 4110 and a second determination condition table 4120.

The first determination condition table 4110 and the second determination condition table 4120 are pre-stored on the determination condition table memory 4100.

In order to determine whether to limit the function of own device, the mobile terminal 1000 refers to the first determination condition table 4110 and the second determination condition table 4120.

FIG. 6A illustrates items listed in the first determination condition table 4110. The first determination condition table 4110 is referred when the mobile terminal 1000 determines in response to the location of registration of the key information whether to limit the function. More specifically, the first determination condition table 4110 is referred when the mobile terminal 1000 determines whether the mobile terminal 1000 is within the "coverage area with no functional limitation imposed" illustrated in FIG. 2.

After the mobile terminal 1000 decides to limit the function as a result of referring to the first determination condition table 4110, the second determination condition table 4120 is further referred to determine whether to limit the function. More specifically, after the mobile terminal 1000 exceeds the "coverage area with no functional limitation imposed" on the way from the location D 6300 to the location E 6400 in FIG. 2, the second determination condition table 4120 is referred for the mobile terminal 1000 to determine whether to start the functional limitation.

The first determination condition table 4110 includes items of starting point location 4111, determination period 4112, specific distance 4113, and condition within margin 4114.

The starting point location 4111 indicates the type of a location serving as a starting point of the movement of the mobile terminal 1000. The type indicated here is identical to the type indicated by the type 4012 in the key information table 4010.

The determination period 4112 indicates a period with which the nearby device information as the information of the nearby device 2000 is collected.

The specific distance 4113 indicates a distance from a location where the key information was registered.

The condition within the margin 4114 indicates a condition under which the determination of whether the mobile terminal 1000 is within the "coverage area margin" illustrated in FIG. 2 is performed.

In accordance with the first embodiment, the count of detected nearby devices 2000 serves as the determination condition depending on the type of location. If one nearby device 2000 is detected out of the key information with the starting point location 4111 being "normal," the mobile terminal 1000 may determine that the mobile terminal 1000 is within the "coverage area margin." If two nearby devices 2000 are detected out of the key information with the starting point location 4111 being "automatic," the mobile terminal 1000 may determine that the mobile terminal 1000 is within the "coverage area margin".

The functional limitation may not be imposed on the mobile terminal 1000 only if all the nearby devices 2000 registered as the key information is detected. However, such an arrangement is inconvenient for the user. The nearby device 2000 registered as the key information may have moved or may have remained switched off. In such a case, the functional limitation is still imposed on the mobile terminal 1000.

A relationship between the travel distance and the specific distance 4113 is described below.

The travel distance calculator 1700 calculates the travel distance based on the acceleration output from the acceleration sensor in the mobile terminal 1000.

The acceleration is a vector value. Since a standard acceleration sensor outputs a vector value in a positive value or a negative value, the direction of travel may also be determined. By storing successively the travel points determined from the vector values output from the acceleration sensor, the mobile terminal 1000 may determine a travel track 1710 as illustrated in FIG. 6C.

The location B 6100—the location F 6500 illustrated in FIG. 6C are determined by integrating twice the vector value, extending from an immediately preceding point to a relative position, with respect to time. The travel track 1710 is a plot of these integrated values.

A relative position is determined based on the vector value output from the acceleration sensor with respect to the location A 6000 registered first. The sequence of movement of the mobile terminal 1000 is thus learned. The positions, if connected, represent the travel track.

In accordance with the embodiment, the function of the mobile terminal 1000 is limited if the travel distance exceeds the specific distance 4113. Two methods of calculating the travel distance are available.

In a first method, a distance between the location A 6000 and the location B 6100, a distance between the location B 6100 and the location C 6200, and a distance between the location C 6200 and the location D 6300 are summed. In a second method, a straight line distance between the location A 6000 and the location F 6500 is calculated.

In accordance with the embodiment, either method works. If measurement errors are small, the second method may be advisable. If the measurement errors are large, the first method may be advisable.

In accordance with the embodiment, the travel distance is calculated using the second method.

FIG. 6B illustrates items of the second determination condition table 4120. The second determination condition table 4120 lists items of immediately preceding location 4121 and exception condition 4122.

The immediately preceding location 4121 indicates the type of an immediately preceding location. The location D 6300 in FIG. 2 is an immediately preceding location.

The exception condition 4122 indicates a condition under which no functional limitation is imposed even if the mobile terminal 1000 is spaced apart from the immediately preceding location by the specific distance 4113.

The mobile terminal 1000 decides not to limit the function with the immediately preceding location 4121 being "normal," if two of the nearby devices 2000 detected at the immediately preceding location are detected. The mobile terminal 1000 decides not to limit the function the immediately preceding location 4121 being "automatic," if the nearby device 2000 having a particular device ID is detected.

Referring to FIG. 5, the type 4012 of the location D 6300 is "automatic." Even if the mobile terminal 1000 exceeds the "coverage area with no functional limitation imposed" of the location D 6300 in FIG. 2, no functional limitation is imposed on the mobile terminal 1000 for a duration of time throughout which the nearby device 2000 having a device ID "xx:xx:xx:xx:xx:xx" is detected. For the duration of time throughout which the nearby device 2000 having the device ID "xx:xx:xx:xx:xx" is detected, the nearby device 2000 having the device ID "xx:xx:xx:xx:xx:xx" is included in the nearby devices 2000 having information collected at regular intervals.

The type of the location D 6300 may be "normal." Even if the mobile terminal 1000 exceeds the "coverage area with no functional limitation imposed" of the location D 6300, no functional limitation is imposed on the mobile terminal 1000 while the mobile terminal 1000 moves together with two nearby devices 2000 of the key information registered at the location D 6300. While the mobile terminal 1000 moves together with two nearby devices 2000 of the key information registered at the location D 6300, two nearby devices 2000 of the key information registered at the location D 6300 are included in the nearby devices 2000 having information collected at regular intervals.

Figure 7A:
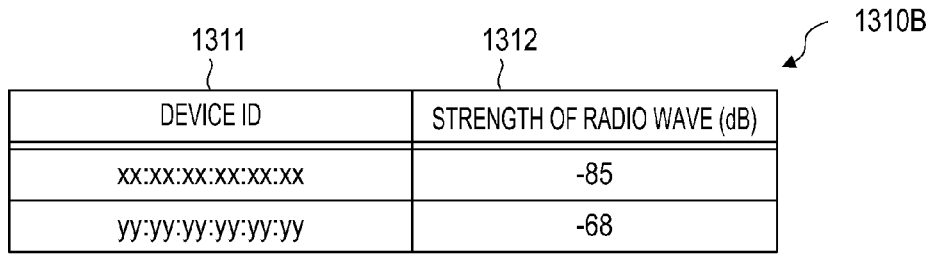
FIGS. 7A-7C illustrate a structure and content of nearby device information in accordance with the first embodiment.
Figure 7B:
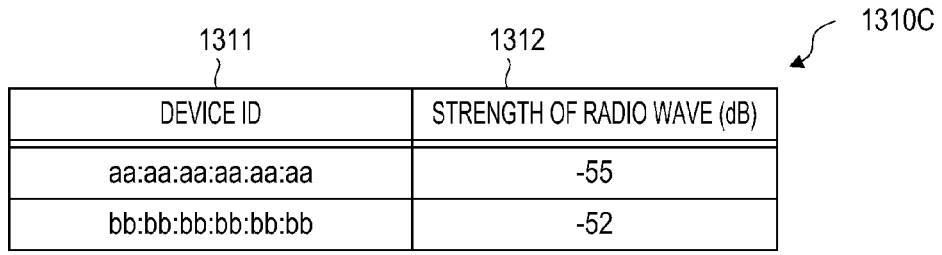
Figure 7C:
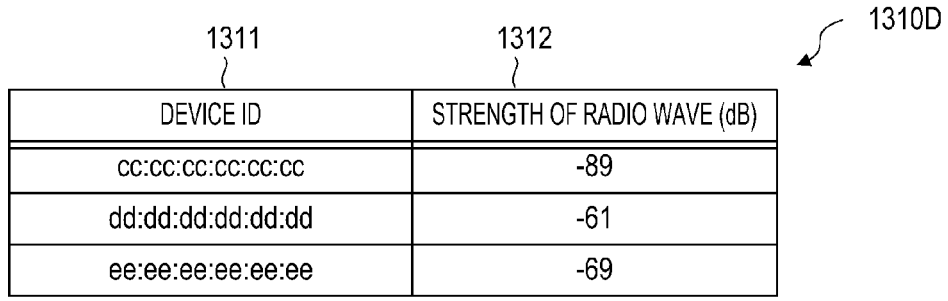

FIGS. 7A-7C illustrate a variety of information included in nearby device information 1310.

The nearby device information 1310 is collected by the nearby device information retrieval unit 1300 and related to the nearby device 2000.

The nearby device information 13108 is information collected at the location B 6100 in FIG. 2. The nearby device information 1310C is information collected within the "coverage area margin" of the location C 6200. The nearby device information 1310D is information collected outside the "coverage area margin" of the location D 6300.

The nearby device information 1310 includes device ID 1311 and radio wave strength 1312.

The device ID 1311 indicates a collected device ID of a nearby device 2000.

The radio wave strength 1312 indicates a radio wave strength of a signal transmitted from the nearby device 2000 corresponding to the device ID 1311. The radio wave strength 1312 is determined in the same way as the radio wave strength 4014 in the key information table 4010 is determined. In other words, the radio wave strength 1312 is a mean value of radio wave strengths measured for a constant period of time.

Display Screen

A display screen used in the mobile terminal 1000 is described with reference to FIG. 8. The display screen is presented on a display of the man-machine interface 1900.

Figure 8:
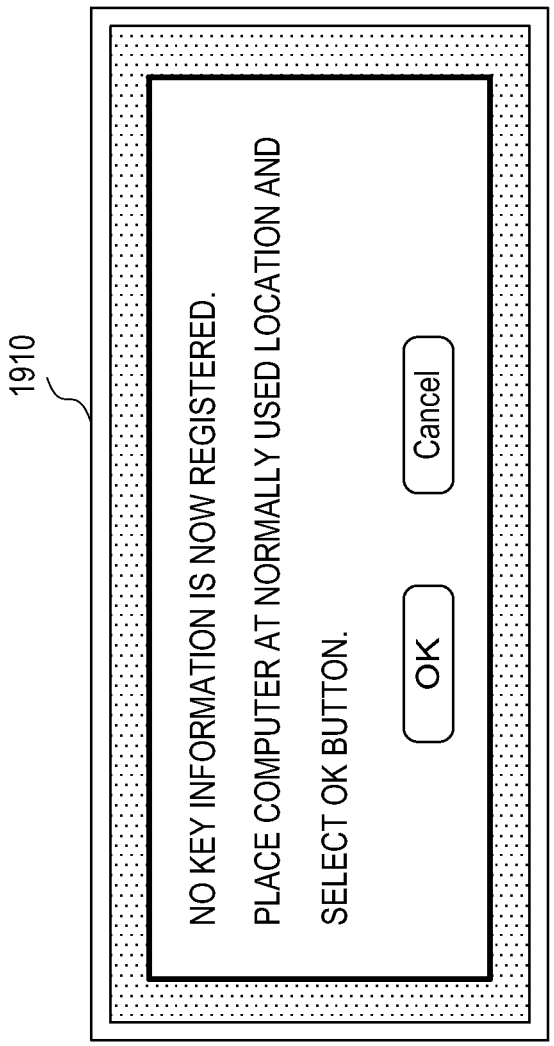
FIG. 8 illustrates a key information registration request screen in accordance with the first embodiment.

FIG. 8 illustrates a key information registration request screen 1910.

The user selects an "OK" button on the key information registration request screen 1910 in order to register the present position as a normal location.

Operation

Operation of the mobile terminal 1000 is described with reference to FIG. 9.

Figure 9:
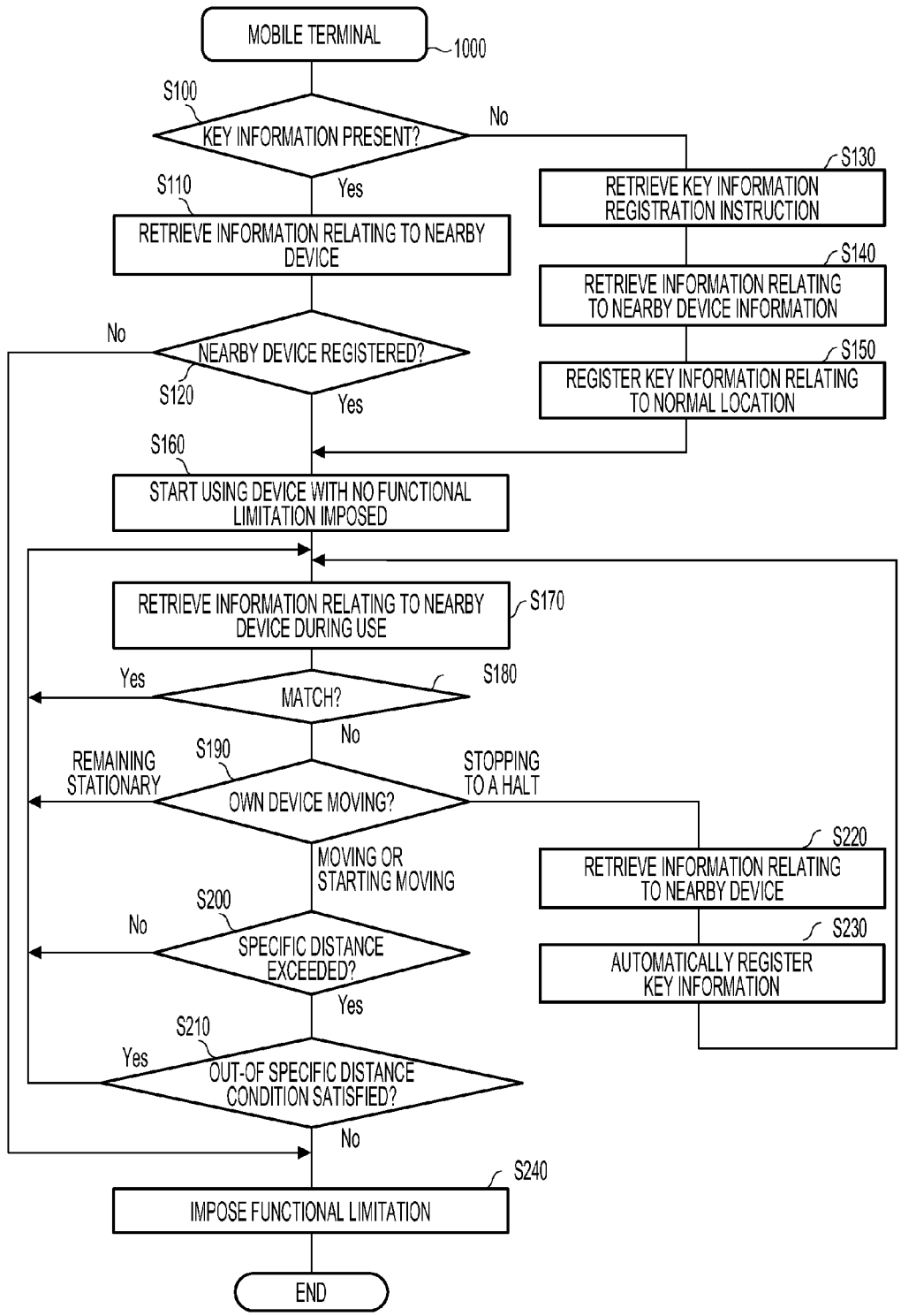
FIG. 9 is a flowchart illustrating a functional limitation process of the mobile terminal of the first embodiment.

FIG. 9 is a flowchart illustrating a functional limitation process of the mobile terminal 1000.

In accordance with the embodiment, the functional limitation on the mobile terminal 1000 is a locked state that inhibits any operation, other than password inputting to the terminal, from being applied to the terminal. The locked state is initiated by a force process. In order for the user to start using the mobile terminal 1000 again out of a functionally limited state, the mobile terminal 1000 is to be started up at the location where the key information has been registered. Alternatively, the mobile terminal 1000 may be started up by performing a particular operation.

The flowchart of FIG. 9 illustrates a process of the mobile terminal 1000 from the resumption of operation in response to the user's switch-on operation of the mobile terminal 1000 to a functional limitation operation.

The user switches on the mobile terminal 1000. Upon being switched on, the mobile terminal 1000 automatically starts up.

Before an initial screen is displayed for the user to start using the mobile terminal 1000, the controller 1100, which is switched on and started up, checks that the key information has been registered in the key information table 4010 stored on the key information table memory 4000 (S100).

If no key information has been registered in the key information table 4010 (no branch from S100), the controller 1100 requests the man-machine interface 1900 to display the key information registration request screen 1910 on the display.

In response to the request, the man-machine interface 1900 displays the key information registration request screen 1910 on the display thereof.

Viewing the key information registration request screen 1910, the user selects the "OK" button.

Upon detecting the selection of the OK button, the man-machine interface 1900 notifies the controller 1100 of it (S130).

The controller 1100 requests the nearby device information retrieval unit 1300 to retrieve information of the nearby device 2000 and register the retrieved information.

The nearby device information retrieval unit 1300 searches a nearby information device via the communication unit 1200. The nearby device information retrieval unit 1300 collects the information of the nearby device 2000. The nearby device information retrieval unit 1300 determines the device ID, the radio wave strength, and the margin of each nearby device 2000 as the information of the nearby device 2000 (S140).

To search for a Bluetooth nearby device 2000, for example, the nearby device information retrieval unit 1300 transmits through the communication unit 1200 an instruction to search for a nearby device.

Upon receiving the instruction, the communication unit 2200 in the nearby device 2000 transfers the received instruction to the controller 2100.

Upon receiving the instruction, the controller 2100 reads the device ID of own device from the device ID memory 2300 and then transmits the device ID to the mobile terminal 1000.

In response to the received device ID, the nearby device information retrieval unit 1300 specifies the device ID to measure the radio wave strength on device ID. The radio wave strength measurement operation may be performed every second for one minute, for example. The nearby device information retrieval unit 1300 determines a mean value of measured radio wave strengths as radio wave strength, and calculates the margin.

The nearby device information retrieval unit 1300 transfers the determined information to the key information generator 1400, thereby requesting the key information generator 1400 to register the determined information.

The key information generator 1400 generates the key information from the received information, such as the device ID. "A" is set in the location 4011, "normal" is set in the type 4012, the received device ID is set in the device ID 4013, the radio wave strength of each received device ID is set in the radio wave strength 4014, and the margin of the received device ID is set in the margin 4015. One record is thus generated. The key information generator 1400 registers the generated key information in the key information table 4010 (S150).

The controller 1100 displays an initial screen of the mobile terminal 1000, and starts a standard operation (S160).

If the controller 1100 is notified that a "CANCEL" button has been selected on the key information registration request screen 1910, the controller 1100 shuts down the mobile terminal 1000.

If it is determined that the key information has been registered in the key information table 4010 (yes branch from S100), the controller 1100 requests the nearby device information retrieval unit 1300 to retrieve the nearby device information 1310 (See FIGS. 7A-7B).

The nearby device information retrieval unit 1300 searches for a nearby information device via the communication unit 1200. The nearby device information retrieval unit 1300 then collects the information of the nearby device 2000 received by the communication unit 1200. The nearby device information retrieval unit 1300 determines as the information of the nearby device 2000 the device ID and the radio wave strength, and generates the nearby device information 1310 (S110). The nearby device information retrieval unit 1300 transfers the generated nearby device information 1310 to the functional limitation determiner 1500.

The functional limitation determiner 1500 refers to the first determination condition table 4110 (See FIG. 6A) and determines whether the key information considered identical to the nearby device information 1310 is registered in the key information table 4010 (S120).

More specifically, the functional limitation determiner 1500 determines whether the nearby device information 1310 is identical to each piece of key information registered in the key information table 4010.

The functional limitation determiner 1500 performs a determination process by referring to the number of nearby devices 2000 having the same device ID. The number is different depending on the type of the starting point location 4111 as illustrated in the condition within the margin 4114 in the first determination condition table 4110. More specifically, if the type 4012 is "normal," the number is one. If the type 4012 is "automatic," the number is two or more.

In order to determine that the device ID 1311 of the nearby device information 1310 is identical to the device ID 4013 of the key information, the following need to be satisfied. First, the device IDs need to be identical to each other, and the radio wave strength 1312 of the nearby device information 1310 needs to fall within the ±margin 4015 with respect to the radio wave strength 4014.

For example, the nearby device information 1310B and the key information at the location 4011 "A" of the key information table 4010 have the same two device IDs, and the radio wave strengths of the two device IDs indicated at the radio wave strength 1312 fall within the radio wave strength ±the margin 4015 indicated at the radio wave strength 4014. The functional limitation determiner 1500 regards the nearby device information as identical to the key information.

For example, the nearby device information 1310D and the key information at the location 4011 "D" of the key information table 4010 have the same three device IDs, and the radio wave strength of the one device ID indicated at the radio wave strength 1312 falls within the radio wave strength ±the margin 4015 indicated at the radio wave strength 4014. The functional limitation determiner 1500 does not regard the nearby device information as identical to the key information.

If it is determined that the key information regarded as identical to the nearby device information 1310 is not stored on the key information table 4010 (no branch from S120), the functional limitation determiner 1500 requests the functional limitation executer 1800 to limit the function.

The functional limitation executer 1800 limits the function of the mobile terminal 1000 (S240). In accordance with the embodiment, the functional limitation to the mobile terminal 1000 is to set the mobile terminal 1000 into a lock state, namely, to inhibit any operation to the mobile terminal 1000 other than inputting of the password. Optionally, the functional limitation operation may include setting the mobile terminal 1000 into a lock state with the mobile terminal 1000 logged off, and keeping the mobile terminal 1000 disabled in the lock state until the mobile terminal 1000 is remotely reset from the lock state. Alternatively, the functional limitation operation may include inhibiting accessing to a particular server with net connection disabled.

If it is determined that the key information identical to the nearby device information 1310 is registered in the key information table 4010 (yes branch from S120), the functional limitation determiner 1500 notifies the controller 1100 of it. The functional limitation determiner 1500 stores on a working memory thereof an identifier of a location indicated by the location 4011 of the key information regarded identical to the nearby device information 1310.

The controller 1100 displays an initial screen of the mobile terminal 1000. The controller 1100 starts a standard operation by activating the remaining elements (S160).

The movement halt detector 1600 analyzes an acceleration output from the three-axis acceleration sensor. The movement halt detector 1600 outputs one of the three states described above. The movement halt detector 1600 further notifies the functional limitation determiner 1500 of the detected state. The movement halt detector 1600 at first notifies the functional limitation determiner 1500 of a stationary state.

The movement halt detector 1600 transfers the acceleration output from the three-axis acceleration sensor to the travel distance calculator 1700. In succession, the travel distance calculator 1700 calculates a travel distance based on the acceleration.

The controller 1100 requests the functional limitation determiner 1500 to start determining whether to limit the function.

The functional limitation determiner 1500 measures the time indicated by the determination period 4112 in the first determination condition table 4110. The time indicated by the determination period 4112 is referred to as "determination period time."

More specifically, if the type 4012 of the location 4011 included in the key information is "normal," the determination period 4112 corresponding to the starting point location 4111 of the first determination condition table 4110 as a "normal" record is regarded as a determination period time. For example, "5 minutes" is set as the determination period time. The key information corresponding to the identifier of the location registered in the working memory is retrieved from the determination condition table.

If no location identifier of the location is stored on the working memory, the functional limitation determiner 1500 retrieves the key information latest registered on the key information table 4010. The functional limitation determiner 1500 determines the determination period time. The functional limitation determiner 1500 stores the location identifier indicated by the location 4011 of the key information on the working memory.

If the determination period time has elapsed, the functional limitation determiner 1500 requests the nearby device information retrieval unit 1300 to retrieve the information of the nearby device 2000.

The nearby device information retrieval unit 1300 searches for the nearby device 2000. The nearby device information retrieval unit 1300 then generates the nearby device information 1310 (S170). The nearby device information retrieval unit 1300 transfers the generated nearby device information 1310 to the functional limitation determiner 1500.

The functional limitation determiner 1500 determines whether the received nearby device information 1310 is regarded as identical to the key information indicated by the identifier of the location stored on the working memory (S180). The determination operation of determining whether the nearby device information 1310 is regarded as identical to the key information is performed in the same manner as in S120.

If the two pieces of information are regarded as identical to each other (yes branch from S180), the functional limitation determiner 1500 measures the determination period time again.

If the two pieces of information are not regarded as identical (no branch from S180), the functional limitation determiner 1500 determines the state of the mobile terminal 1000 received from the movement halt detector 1600. If it is determined that the state is a stationary state (Stationary state from S190), the nearby device information retrieval unit 1300 measures the determination period time again.

A communication status may change because of a movement of a nearby device regardless of the stationary state of own device. In such a case, the mobile terminal 1000 does not limit the function of the mobile terminal 1000. User friendliness is thus increased.

If the mobile terminal 1000 is moving (moving or starting moving from S190), the travel distance calculator 1700 is requested to calculate the travel distance.

The travel distance calculator 1700 transfers the calculated travel distance to the functional limitation determiner 1500.

The functional limitation determiner 1500 determines whether the travel distance is within a specific distance (S200).

The functional limitation determiner 1500 determines the specific distance as described below. The functional limitation determiner 1500 first retrieves an identifier of a location stored on the working memory. Referring to the key information table 4010, the functional limitation determiner 1500 reads the type 4012 of the location corresponding to the retrieved location identifier. Referring to the first determination condition table 4110, the functional limitation determiner 1500 determines the specific distance 4113 of the record having the same type as the read type of the starting point location 4111. For example, the location type is "normal," the specific distance 4113 is 20 m. If the location type is "automatic," the specific distance 4113 is "10 m."

If the travel distance is within the specific distance (no branch from S200), the nearby device information retrieval unit 1300 measures the determination period time again.

If the travel distance exceeds the specific distance (yes branch from S200), the functional limitation determiner 1500 refers to the second determination condition table 4120 and determines whether to limit the function.

If the exception condition 4122 is satisfied in the second determination condition table 4120, the functional limitation determiner 1500 does not limit the function. If the exception condition 4122 is not satisfied, the functional limitation determiner 1500 limits the function.

The functional limitation determiner 1500 refers to the key information table 4010 and reads the type 4012 corresponding to the identifier of the location stored on the working memory. The functional limitation determiner 1500 refers to the second determination condition table 4120 and then refers to the exception condition 4122 corresponding to the immediately preceding location 4121 of the same type as the read type.

For example, if the read type is "normal," the functional limitation determiner 1500 stores the immediately preceding nearby device information 1310 on the working memory. The immediately preceding nearby device information is nearby device information that was retrieved in an immediate preceding process in which the functional limitation was not to be performed. The functional limitation determiner 1500 requests the nearby device information retrieval unit 1300 to retrieves the information of the nearby device 2000. The functional limitation determiner 1500 receives from the nearby device information retrieval unit 1300 the nearby device information 1310. The functional limitation determiner 1500 compares the received nearby device information 1310 with the nearby device information 1310 stored on the working memory. The functional limitation determiner 1500 determines that the condition is satisfied if two or more device IDs indicated by the device IDs 1311 are identical to each other. If the two or more device IDs indicated by the device IDs 1311 are identical to each other and the radio wave strengths 1312 of the same device IDs fall within a constant difference range, the functional limitation determiner 1500 may determine that the condition is satisfied.

If the type of location is "automatic," the functional limitation determiner 1500 determines whether "xx:xx:xx:xx:xx:xx" is registered on the device ID 1311 of the immediately preceding nearby device information 1310. If "xx:xx:xx:xx:xx:xx" is registered on the device ID 1311, the functional limitation determiner 1500 determines that the condition is satisfied. If "xx:xx:xx:xx:xx:xx" is not registered on the device ID 1311, the functional limitation determiner 1500 determines that the condition is not satisfied.

If the condition is satisfied (yes branch from S210), the functional limitation determiner 1500 measures the determination period time again.

If the condition is not satisfied (no branch from S210), the functional limitation determiner 1500 requests the functional limitation executer 1800 to limit the function.

In response to the request, the functional limitation executer 1800 limits the function of the mobile terminal 1000 (S240).

If it is determined in S190 that the mobile terminal 1000 is in a halt state (halt state from S190), the functional limitation determiner 1500 retrieves the information of the nearby device 2000. The functional limitation determiner 1500 requests the nearby device information retrieval unit 1300 to register the information of the nearby device 2000 as the key information.

The nearby device information retrieval unit 1300 searches for a nearby information device via the communication unit 1200. The nearby device information retrieval unit 1300 collects the information of the nearby device 2000 received by the communication unit 1200 (S220).

The nearby device information retrieval unit 1300 transfers the collected information to the key information generator 1400 and requests the key information generator 1400 to register the collected information.

The key information generator 1400 generates the key information from the received information. The key information generator 1400 registers the generated key information in the key information table 4010 (S230).

The functional limitation determiner 1500 determines the determination period time at the determination period 4112 corresponding to an "automatic" location at the starting point location 4111 of the first determination condition table 4110. The functional limitation determiner 1500 starts measuring the determination period time.

The functional limitation determiner 1500 requests the movement halt detector 1600 to begin with a stationary state.

In response to the request, the movement halt detector 1600 sets the current state to a stationary state.

The functional limitation determiner 1500 clears the travel distance calculated by the travel distance calculator 1700. The functional limitation determiner 1500 requests the travel distance calculator 1700 to start with a zero travel distance.

The travel distance calculator 1700 clears the calculated travel distance. The travel distance calculator 1700 then starts calculating newly the travel distance. By resetting the travel distance in this way, a cumulative error of the travel distance is periodically canceled. This process also controls a usage limitation due to a measurement error in the travel distance. User friendliness is thus increased.

Second Embodiment

In accordance with the first embodiment, the first determination condition table 4110 and the second determination condition table 4120 are stored on the determination condition table memory 4100. The first determination condition table 4110 and the second determination condition table 4120 may be downloaded from a server or the like.

The user may modify the condition depending on the attribute of the user in the embodiment where the mobile terminal 1000 downloads from the server or the like the first determination condition table 4110 and the determination period 4112. For example, the attribute of the user may be a section in a corporation which the user is assigned to. In accordance with the embodiment, no time is consumed in the writing of the first determination condition table 4110 and the second determination condition table 4120 even if the user is re-assigned to another section within the corporation. In accordance with the embodiment, the condition is easily modified, and flexibly responds to the application situation.

Figure 10:
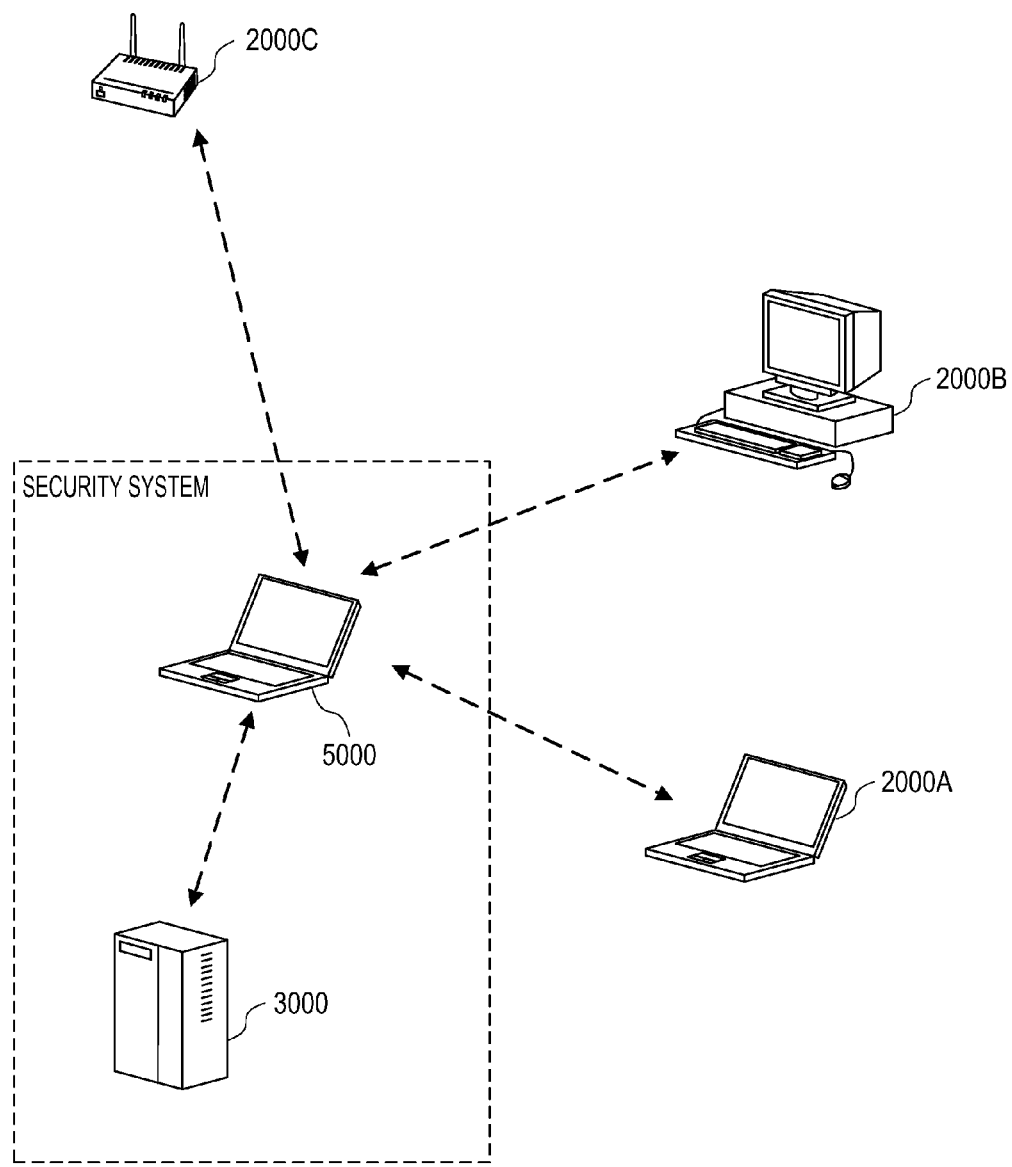
FIG. 10 illustrates a structure of a security system in accordance with a second embodiment.

FIG. 10 illustrates a structure of a security system.

The security system includes a mobile terminal 5000 and a manager device 3000.

The mobile terminal 5000 and the manager device 3000 of the embodiment are described below.

Function

Figure 11:
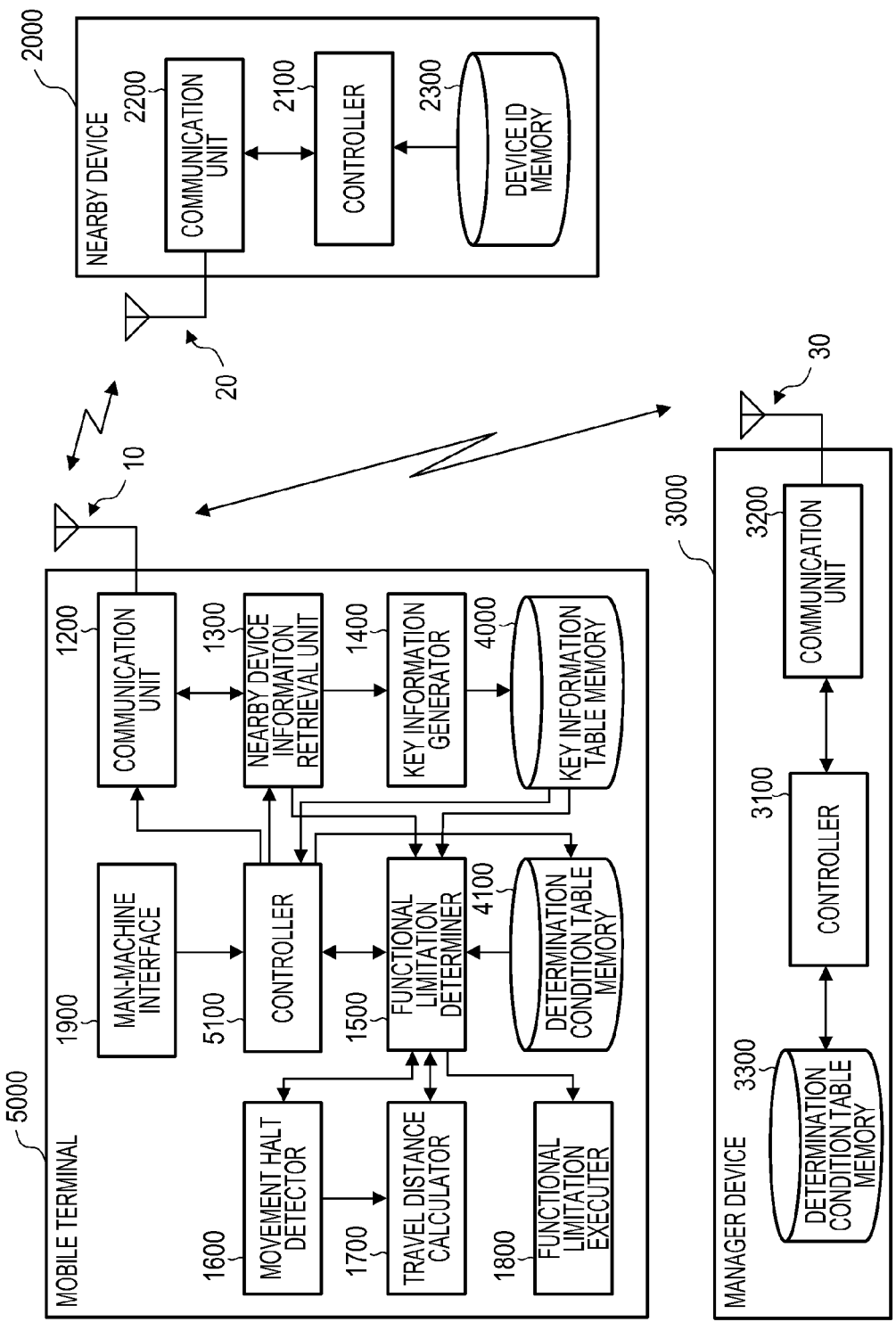
FIG. 11 is a block diagram illustrating a process of each of the mobile terminal, management device, and nearby device in accordance with the second embodiment.

FIG. 11 is a block diagram illustrating elements of each of the mobile terminal 5000, the manager device 3000, and the nearby device 2000.

The nearby device 2000 has the same function as that of the nearby device 2000 previously discussed with reference to FIG. 4.

The mobile terminal 5000 is substantially identical in function to the mobile terminal 1000 previously discussed with reference to FIG. 4.

A block in the mobile terminal 5000 different from the counterpart in the mobile terminal 1000 is a controller 5100. The controller 5100 requests the first determination condition table 4110 and the second determination condition table 4120 from the manager device 3000 via the communication unit 1200. The controller 5100 stores on the determination condition table memory 4100 the received the first determination condition table 4110 and second determination condition table 4120.

The manager device 3000 includes controller 3100, communication unit 3200, and determination condition table memory 3300. The manager device 3000 is a server, for example.

The controller 3100 has a function that is basically supported by a server. In response to the request from the mobile terminal 5000, the controller 3100 transmits the first determination condition table 4110 and the second determination condition table 4120.

The communication unit 3200 wirelessly communicates with the mobile terminal 5000 via an antenna 30.

The manager device 3000 stores a determination condition table for determining whether to limit the function.

The determination condition table memory 3300 stores the first determination condition table 4110 and the second determination condition table 4120. The determination condition table memory 3300 also stores data that maps the first determination condition table 4110 and the second determination condition table 4120 to an identifier of the mobile terminal 5000. The identifier of the mobile terminal 5000 is a MAC address, an identifier identifying a user stored on the mobile terminal 5000, or the like.

The controller 3100 identifies the first determination condition table 4110 and the second determination condition table 4120 mapped to the MAC address of the mobile terminal 5000 having requested the determination tables. The controller 3100 transmits a variety of determination condition tables to the mobile terminal 5000 having transmission requested the determination condition tables.

Part or all of the functions described above are performed when the CPUs of the mobile terminal 5000 and the manager device 3000 execute respective programs stored on the memories of the mobile terminal 5000 and the manager device 3000.

Data used in the security system of the second embodiment remains unchanged from the data used in the first embodiment.

Operation

Operation of the mobile terminal 5000 of the security system of the second embodiment is described with reference to FIG. 12.

FIG. 12 is a flowchart illustrating a function limitation process of the mobile terminal 5000.

The process of the mobile terminal 5000 is different from the process of the mobile terminal 1000 discussed with reference to FIG. 9 as described as below.

The difference between the mobile terminal 1000 and the mobile terminal 5000 is that a process of retrieving from the manager device 3000 the first determination condition table 4110 and the second determination condition table 4120 is added.

Referring to FIG. 12, the user switches on the mobile terminal 5000, and selects the "OK" button on the key information registration request screen 1910 (See FIG. 8) displayed by the controller 1100 that has been switched and started. After the key information has been registered in the key information table 4010 (no branch from S100, and S130-S150), the mobile terminal 5000 retrieves from the manager device 3000 the first determination condition table 4110 and the second determination condition table 4120 (S300).

More specifically, the controller 5100 requests from the manager device 3000 the first determination condition table 4110 and the second determination condition table 4120 via the communication unit 1200.

The controller 3100 having received the request identifies the first determination condition table 4110 and the second determination condition table 4120 mapped to the MAC address of the mobile terminal 5000 having requested the tables to be transmitted. The manager device 3000 transmits the identified tables to the mobile terminal 5000.

The controller 5100 causes the determination condition table memory 4100 to store the received first determination condition table 4110 and second determination condition table 4120.

The subsequent process is identical to the process illustrated in FIG. 9.

Referring to FIG. 12, the first determination condition table 4110 and the second determination condition table 4120 are first retrieved from the manager device 3000. Alternatively, when the determination operation of determining whether to perform the functional limitation is performed in each of S120, S180, etc., the first determination condition table 4110 and the second determination condition table 4120 may be retrieved. The manager device 3000 may transmit to the mobile terminal 5000 the first determination condition table 4110 and the second determination condition table 4120, each having a condition accounting for a time band, the day of week, etc., for example.

Other Embodiments

The embodiments of the present invention have been discussed. The present invention is not limited to the above-described embodiments.

(1) In accordance with the embodiments, the acceleration sensor is used to detect the movement of the mobile terminal. A device other than the acceleration sensor may be used.

For example, a mobile terminal having a luminance sensor may detect movement by detecting luminance.

A mobile terminal having a camera may detect movement thereof by detecting a change in video picked up by the camera.

A mobile terminal may detect movement in response to a particular operation by the user.

(2) In accordance with the embodiments, means other than the acceleration sensor may be used to measure the travel distance of the mobile terminal.

For example, the mobile terminal may detect a change in the altitude of the mobile terminal using a pressure sensor. For example, the mobile terminal detects a change of floor in a building using the pressure sensor.

The mobile terminal may measure a travel distance with respect to an office as a reference point using a GPS receiver.

(3) In accordance with an embodiment, the mobile terminal is a notebook computer. The mobile terminal may be an information processing apparatus different from the computer. The mobile terminal may be a cellular phone, a personal digital assistant (FDA), or the like.

(4) In accordance with the embodiments, the mobile terminal is shut down if the "CANCEL" button is selected on the key information registration request screen 1910. Another operation may be performed in response to the selection of the "CANCEL" button.

The user may use part of the functions. The user may be prohibited from using the rest of the functions other than the part of the functions of the mobile terminal. The mobile terminal may close the key information registration request screen 1910. The mobile terminal may display repeatedly the key information registration request screen 1910 until the key information is registered.

The mobile terminal may perform constantly the same operation. The mobile terminal may perform a different operation depending on the usage location of the terminal or depending on user.

The mobile terminal may operate described above if no key information is registered. A mobile terminal of a sales staff having lots of opportunities to use the mobile terminal out of office is set to be disabled until the key information is registered. A mobile terminal of an of staff having a less opportunities to use the mobile terminal outside an office is enabled to be used with the functions partly limited. The mobile terminal may thus be flexibly used.

(5) In accordance with the embodiments, the number of device IDs and the radio wave strengths thereof are used for a condition under which the nearby device information is regarded as identical to the key information. The mobile terminal may perform a determination process accounting for another factor.

For example, in the case of a condition based on another factor, the nearby device information may be regarded as identical to the key information if the radio wave strengths of all the nearby devices 2000 registered as the key information fall within the respective margins, or if the radio wave strengths of at least half the devices fall within the respective margins, if the wireless LAN access point agrees with the key information, or if the radio wave strengths of at least two nearby devices 2000 fall within the respective margins in the case of the wireless LAN access point in disagreement with the key information.

A condition based on another factor may be that at least two nearby devices need to agree with specific radio wave strength if the mobile terminal is in a stationary state, or that at least one nearby device needs to agree with specific radio wave strength if the mobile terminal is in a moving state.

(6) In accordance with the above-described embodiments, the specific distance is set to be long if the location type with the key information matched immediately before is "normal," and is set to be short if the location type is "short." The specific distance defining the "coverage area with no functional limitation imposed" illustrated in FIG. 2 may be determined taking into another factor.

For example, the specific distance may be long during daytime office hours, and short during nighttime extra job hours.

(7) Part or all of the elements of the mobile terminal illustrated in FIG. 4 or other drawings may be implemented using one-chip integrated circuit or a plurality of chips of integrated circuits.

(8) Part or all of the elements of the mobile terminal illustrated in FIG. 4 or other drawings may be implemented using a computer program. The elements of the mobile terminal may be implemented in any other embodiment.

The security program may be stored on a recording medium such as a memory card, or a CD-ROM. The security program may be read onto a computer for execution. The security program may be downloaded for execution onto the computer via a network.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the mobile terminal 1000, a nearby device 2000, manager device 3000, . . . , etc.) comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. An information processing apparatus, comprising:
a memory that registers, in an authentication key information table, authentication key information including first identification information identifying a first nearby device capable of communication with the information processing apparatus;
a transmitter to communicate with devices; and
a computer processor operable to:
communicate with a second nearby device to retrieve second nearby device information including second identification information identifying the second nearby device;
detect a movement status of the information processing apparatus; and
determine whether to limit a functionality of the information processing apparatus, based on a detection by the information processing apparatus of the registered authentication key information from the first nearby device, retrieval by the information processing apparatus of the second nearby device information from the second nearby device, and the movement status.

2. The information processing apparatus according to claim 1, wherein the computer processor is further operable to limit the functionality of the information processing apparatus if the authentication key information and the second nearby device information fail to satisfy a specific condition and if the movement status detected indicates that the information processing apparatus has moved.

3. The information processing apparatus according to claim 2, wherein the computer processor is further operable to limit the functionality of the information processing apparatus if the first identification information included in the authentication key information fails to match the second identification information included in the second nearby device information.

4. The information processing apparatus according to claim 1, the computer processor is further operable to:
calculate based upon the movement status detected, a travel distance of the information processing apparatus from a location where the authentication key information was registered in the key information table, and
limit the functionality of the information processing apparatus if the travel distance exceeds a specific distance.

5. The information processing apparatus according to claim 1, wherein if a halt in movement of the information processing apparatus is detected, another nearby device information including third identification information identifying a detected third nearby device is retrieved, and
wherein the computer processor is further operable to generate another authentication key information based on the another nearby device information retrieved, and registering the another authentication key information in the authentication key information table.

6. The information processing apparatus according to claim 1, wherein the authentication key information table stores the authentication key information with a radio wave strength for communication with the first nearby device mapped to the authentication key information,
wherein the computer processor is further operable to:
retrieve another radio wave strength for communication with the second nearby device, and
determine based on the radio wave strength for the first nearby device and the another radio wave strength for the second nearby device whether to limit the functionality of the information processing apparatus.

7. The information processing apparatus according to claim 1, wherein the information processing apparatus is a mobile terminal.

8. The information processing apparatus according to claim 4, wherein if the travel distance exceeds a specific distance, the computer processor is further operable to determine whether another condition different from the specific condition is satisfied, and if the other condition is not satisfied, limit the functionality of the information processing apparatus.

9. The information processing apparatus according to claim 8, wherein the authentication key information table memory stores the authentication key information with a location identifier identifying a location where the authentication key information was registered mapped to the authentication key information, and
wherein the computer processor is further operable to reference the authentication key information corresponding to a location where the information processing apparatus had been before the specific distance was exceeded, and if the second nearby device information is included in the authentication key information, determine that the other condition is satisfied.

10. The information processing apparatus according to claim 6, wherein the computer processor is further operable to limit the functionality of the information processing apparatus if the another radio wave strength for the second nearby device falls outside a specific range from the radio wave strength for the first nearby device.

11. The information processing apparatus according to claim 2, wherein the computer processor is further operable to:
calculate based upon the movement status detected, a travel distance of the information processing apparatus from a location where the authentication key information was registered in the authentication key information table, and
limit the functionality of the information processing apparatus if the travel distance exceeds a specific distance.

12. The information processing apparatus according to claim 2, wherein if a halt in movement of the information processing apparatus is detected, another nearby device information including third identification information identifying a detected third nearby device is retrieved, and
wherein the computer processor is further operable to generate another authentication key information based on the another nearby device information retrieved, and register the another authentication key information in the authentication key information table.

13. The information processing apparatus according to claim 2, wherein the authentication key information table stores the authentication key information with a radio wave strength for communication with the first nearby device mapped to the authentication key information,
wherein the computer processor is further operable to:
retrieve another radio wave strength for communication with the second nearby device, and
determine based on the radio wave strength for the first nearby device and the another radio wave strength for the second nearby device whether to limit the functionality of the information processing apparatus.

14. The information processing apparatus according to claim 3, wherein the computer processor is further operable to:

calculate based upon the movement status detected, a travel distance of the information processing apparatus from a location where the authentication key information was registered in the authentication key information table, and limit the functionality of the information processing apparatus if the travel distance exceeds a specific distance.

15. The information processing apparatus according to claim 3, wherein if a halt in movement of the information processing apparatus is detected, another nearby device information including third identification information identifying a detected third nearby device is retrieved, and wherein the computer processor is further operable to generate another authentication key information based on the another nearby device information retrieved, and register the another authentication key information in the authentication key information table.

16. The information processing apparatus according to claim 4, wherein if a halt in movement of the information processing apparatus is detected, another nearby device information including third identification information identifying a detected third nearby device is retrieved, and wherein the computer processor is further operable to generate another authentication key information based on the another nearby device information retrieved, and register the another authentication key information in the authentication key information table.

17. The information processing apparatus according to claim 4, wherein the authentication key information table stores the authentication key information with a radio wave strength for communication with the first nearby device mapped to the authentication key information, wherein the computer processor is further operable to:
retrieve another radio wave strength for communication with the second nearby device, and
determine based on the radio wave strength for the first nearby device and the another radio wave strength for the second nearby device whether to limit the functionality of the information processing apparatus.

18. The information processing apparatus according to claim 5, wherein the authentication key information table stores the authentication key information with a radio wave strength for communication with the first nearby device mapped to the authentication key information, wherein the computer processor is further operable to:
retrieve another radio wave strength for communication with the second nearby device, and
determine based on the radio wave strength for the first nearby device and the another radio wave strength for the second nearby device whether to limit the functionality of the information processing apparatus.

19. A security method to be executed by a computer, the security method comprising:

registering, in an authentication key information table in a memory, authentication key information including first identification information of a first nearby device capable of communication with the computer;

communicating with a second nearby device for retrieving second nearby device information including second identification information identifying the second nearby device;

detecting a movement status of the computer; and determining whether to limit a functionality of the computer, based on a detection by the information processing apparatus of the registered authentication key information from the first nearby device, retrieval by the information processing apparatus of the second nearby device information from the second nearby device, and the movement status.

20. A non-transitory storage medium storing a security program that causes a computer to execute:

registering, in an authentication key information table in a memory, authentication key information including first identification information of a first nearby device capable of communication with the computer;

communicating for a second nearby device for retrieving second nearby device information including second identification information identifying the second nearby device;

detecting a movement status of the computer; and determining whether to limit a functionality of the computer, based on a detection by the information processing apparatus of the registered authentication key information from the first nearby device, retrieval by the information processing apparatus of the second nearby device information from the second nearby device, and the movement status.

* * * * *